(No Model.)
J. S. BEEMAN.
CLUTCH FOR MACHINERY.
No. 558,030. Patented Apr. 14, 1896.
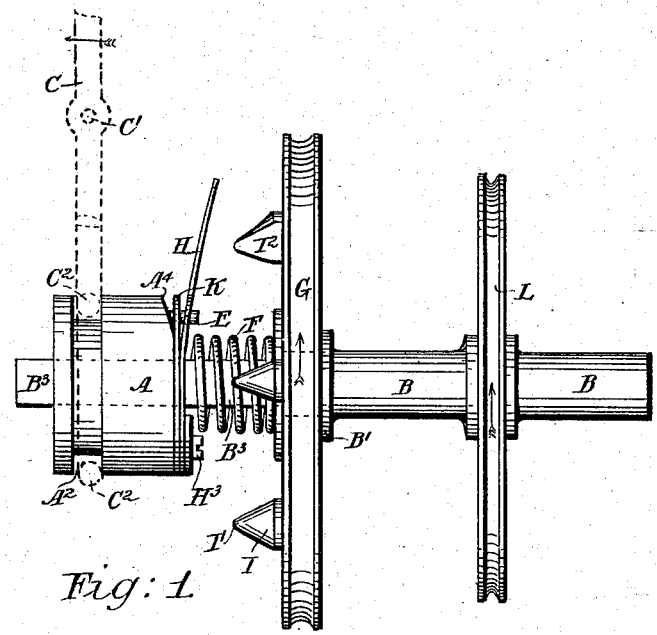
Fig: 1.
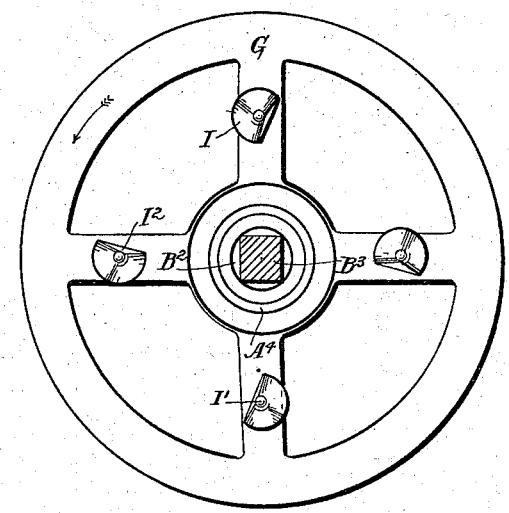
Fig: 2.
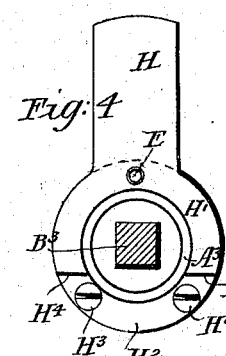
Fig: 4.
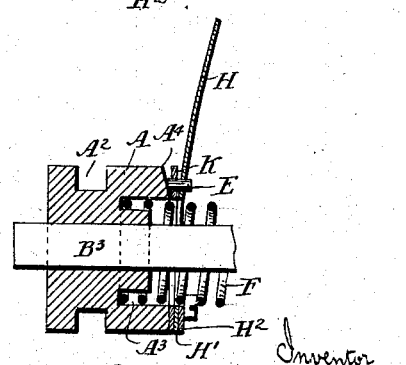
Fig: 3.
Witnesses
H. van Oldenneel
E. A. Scott
Inventor
Joseph Samuel Beeman
by Richardson
Attorneys

UNITED STATES PATENT OFFICE.

JOSEPH S. BEEMAN, OF MELBOURNE, VICTORIA.

CLUTCH FOR MACHINERY.

SPECIFICATION forming part of Letters Patent No. 558,030, dated April 14, 1896.

Application filed November 26, 1895. Serial No. 570,225. (No model.)

*To all whom it may concern:*

Be it known that I, JOSEPH SAMUEL BEEMAN, a subject of the Queen of Great Britain, and a resident of Station Street, Camberwell, Melbourne, in the Colony of Victoria, have invented a certain new and useful Improvement in Clutches for Machinery, of which the following is a specification.

This invention provides improvements in that form of apparatus technically known as a "clutch"—that is to say, mechanism for throwing one portion of machinery in and out of gear or contact with another part of machinery either in motion or at a standstill, so as to cause a whole set of machinery to come into or go out of operation.

My invention has most especial reference to a means whereby that half of the clutch (commonly called the "fixed" member of the clutch in contradistinction from the opposite or loose member) which slides backward and forward upon its shaft can travel backward and forward on said shaft with greater facility and promptness than has heretofore been the case, but has also reference in a lesser degree to the fixed and loose members themselves.

Although my invention is applicable for connecting and disconnecting two shafts whose axes of rotation are in the same straight line, it is especially applicable for the purpose of connecting and disconnecting a main driving-shaft and driven wheel mounted loosely and capable of revolving upon the said shaft, and any intelligent mechanic can adapt the application of my invention as described herein to the former purpose.

In order that my invention may be the more easily understood, reference may be made to the accompanying drawings, which illustrate the application of my invention to a main driving-shaft and driven wheel mounted loosely on said main shaft, in which—

Figure 1 is a plan view embodying my improvements, constituting a complete clutch; Fig. 2, a front view of a part of same, and Fig. 3 a detail section of some of the parts, while Fig. 4 is a detail elevation of a portion of my improvements.

In the drawings, B B B' B³, as illustrated in Fig. 1, represent plan views of the exposed parts of the main driving-shaft, (referred to in its complete state as the "main driving-shaft,") and B³, Fig. 2, is a cross-section of part B³, Fig. 1. B², Fig. 2, shows the difference of diameter of the part of the shaft shown in dotted lines hid from view in Fig. 1 to that of the exposed part B.

The part B², Fig. 2, is the center upon which the wheel G, hereinafter referred to, revolves. The main driving-shaft is preferably made of various cross-sections, the parts marked B B being formed to run in bearings, the part marked B forming a shoulder for the driven wheel G, hereinafter referred to, to revolve and rest against. The part marked B², Fig. 2, is of smaller diameter than the part B and forms a center upon which the driven wheel G can rest when not rotating and during the time the main driving-shaft is revolving, the part marked B³ being, preferably, square in cross-section, as shown at B³, Figs. 2 and 4, but may be circular and fitted with a fixed feather-key to correspond with a corresponding bore or passage in the block A, hereinafter referred to.

The main driving-shaft has motion given to it by any convenient means, such as a pulley L driven by a belt rigidly fixed to said shaft. Upon the portion B² of main driving-shaft is mounted a wheel G, which may be a cog, belt, or friction-wheel, free to rotate and abutting against B', previously described. This wheel G carries on its face one or more projecting pins or teeth, such as I, preferably of the shape shown in Figs. 1 and 2, so as to engage with and also release, with as little friction as possible, the clutch-plate H hereinafter referred to, and for this purpose the points I' are rounded off or may contain a ball or any antifriction device, and the engagement-faces I² cut aslant so that the engaging edge of H may enter into and leave its engagement with the blocks I in an unobstructed manner.

G has a circular recess A⁴, Fig. 2, for a similar object to the recess A³ in A, Fig. 3, as hereinafter explained.

G, together with its pin or pins I, is for the sake of convenience called the "loose" member. Upon the portion B³ of main driving-shaft is mounted a block of metal, such as A, and for sake of convenience called the "fixed" member, arranged to slide freely along B³. C is the usual rod or lever for giving the forward-and-backward sliding motion to the block A. This lever C is centered at C' and is provided with two rectangular forks or horns C², which operate in a recess A² of the block A.

In Fig. 3 it will be seen that the block A has a circular recess A³ sunk in its front face and is also provided with a stud E, the function of which latter will be hereinafter explained.

F is a spiral spring (see Figs. 1 and 3) operating to keep the block A apart from the wheel G, Fig. 1, and should be carefully constructed so as to exert an even pressure upon the whole of the face of A in the annular channel or recess A³, Fig. 3, the recess A³ having for its object the keeping of the spring F in position.

I desire it to be understood that the employment of this spring F is the most important feature of my invention, inasmuch as it has the effect of preventing binding and cross-friction between the block A and its shaft B by reason of thrust of F being exerted in a line parallel to the axis of the main driving-shaft, and at the same time facilitates the releasing of the clutched members of A and G from one another. This part of my invention is applicable to most of the existing forms of clutch.

H (see Figs. 1, 3, and 4) is a plate of spring metal fulfilling the functions of a coupling-thumb for engagement with one of the pins I of the wheel G. This plate H is preferably constructed in the shape shown on Fig. 4—that is to say, beginning at its top somewhat in the form of a parallelogram and terminating in a ring or annular plate H'. This ring H' is kept in position against the block A by a small curved outer plate H², Fig. 4, and screws H³ H³, and is also backed by an annular plate or washer K, (see Figs. 1 and 3,) also constructed of spring metal.

Reverting again to the block A, it will be noticed that a part of the same has been cut away at A⁴, Figs. 1 and 3, for the purpose of permitting a slight backward movement of the top of spring-washer K when the plate H presses or impinges against same.

It will be seen that the stud E, which passes freely through holes in K and H, also forms a guide for the flexible washer K and clutch-plate H when they are under pressure.

The curved plate H², Fig. 4, is constructed of metal and is placed in the manner shown, so that its parts H⁴ H⁴ will form a stay or support to back up and strengthen the annular plate H' and obviate the possibility of the said plate H' snapping off at the bolt-screws H³ H³ or of the heads of the said screws H³ H³ being broken off from their shanks by the direct angular strain of H', which would otherwise occur at those particular points, or alternatively I may back up the pins I with a flexible spring or analogous device in order that when the point I' during the rotary progression is touched by the front face of H, which in this case need have no spring appertaining to it, the impact of the blow is thus slightly cushioned and thus obviates friction or scratching by the said point I' on the face of H; but in practice I prefer the construction, as illustrated, as I find that the spring-plate H, assisted by the backing-spring K, satisfactorily fulfils its function in cushioning off the sudden superimposition or impact of plate H upon the point I', particularly as the points I are constructed of an antifriction form.

In some cases I do not require to use the pins I at all, in which case the friction of the spring-plate H, when pressed upon and held against the face of the loose member or wheel G, (which would then be a disk instead of having arms, as illustrated,) would be sufficient to cause G to revolve.

The *modus operandi* of my invention is as follows: The main driving-shaft being set in motion, (presumably by the pulley L,) the fixed member A revolves therewith in the direction shown by the arrows marked on L. Presuming it is now desired to place the wheel G in motion the operator moves the clutch-handle C in the direction shown by the arrow upon the same, thus causing the fixed member A to move forward in the direction of the arrow upon the same, thus bringing the face of the plate H either into the space not occupied by pin I or into contact with one of the points I' of the loose member G. If H should come into contact with I, it (H) will slip past and down or along point I' until it meets one of the faces I² of the pin I and the clutch engagement will be completed. When the plate H meets the point I', the pressure of the operating-handle C will cause H to momentarily deflect until such time as H has passed the point I', when, as aforesaid, the engagement will immediately follow.

It will be noticed that during the operation last described the spring F, having been compressed, has acquired stored energy, which necessitates the clutch-handle C being locked in position until such time as the clutched parts of A and G are to be released.

When it is desired to free the fixed member A and loose member G from engagement, the handle C is unlocked and the spring F will immediately push back the block A, either by the energy of its expansion alone or with the addition of a little power on the handle C, and it will also be found that the said outward expansive energy exerted by the spring F will prevent the block A from binding its shaft B, owing to its direct thrust upon the face of A³.

Having now particularly described and ascertained the nature of my said invention and in what manner the same is to be performed, I declare that what I claim is—

1. In combination with a loose member, as G, a fixed member as A, having longitudinal movement, a spring clutch-plate carried by the fixed member and engaging the loose member, substantially as described.

2. In combination, a loose member, projecting studs on its face, a fixed member having longitudinal movement, a spring separating the parts, a spring clutch-plate carried by the fixed member and adapted to engage the projections, substantially as described.

3. In combination, a loose member, a fixed member, a spring clutch-plate, and projections on the loose member, said projections being tapering and cut aslant on one face and adapted to be engaged by the spring clutch-plate, substantially as described.

4. In combination, the loose member having the projecting studs, the fixed member, the spring clutch-plate carried thereby to engage the studs, and a backing-plate K also carried by the fixed member and having a portion to reinforce the spring clutch-plate, substantially as described.

5. In combination, the loose member G, having the projecting studs, the fixed member having a cut-away part $A^4$, the spring clutch-plate H carried by the fixed member, and backing-plate K having a portion extending adjacent to the cut-away part $A^4$ to reinforce the spring clutch-plate when the latter is under pressure, substantially as described.

Signed this 5th day of October, 1895.

J. S. BEEMAN.

Witnesses:
A. O. SACHSE,
A. HARKER.